July 1, 1969  C. W. LOTZ  3,453,181
EVAPORATOR UNIT WITH INTEGRAL LIQUID HEATER
Filed Dec. 21, 1965  Sheet 1 of 2

INVENTOR
CHARLES W. LOTZ
BY
ATTORNEY

INVENTOR
CHARLES W. LOTZ
BY
ATTORNEY

3,453,181
EVAPORATOR UNIT WITH INTEGRAL LIQUID HEATER
Charles W. Lotz, South Burlington, Vt., assignor to General Electric Company, a corporation of New York
Filed Dec. 21, 1965, Ser. No. 515,344
Int. Cl. B01d 3/28, 1/04
U.S. Cl. 202—173                              3 Claims

ABSTRACT OF THE DISCLOSURE

The improvement in evaporator apparatus for distillation of liquids including, integral heater means comprising multiple sections of the supply or feed liquid inlet conduit traversing the lower portion of the evaporator unit, nozzle means for directing a relatively hot fluid onto the surface of said multiple conduit sections, whereby the hot fluid gives up its heat of condensation to the feed liquid, the feed liquid then being directed from an outlet at the upper end of the evaporator unit onto an evaporation wall, and respective collector means to capture the unevaporated feed liquid and the condensate from the integral heater means and a condenser wall in said unit.

---

The present invention relates to an evaporator unit, particularly adapted for use as one stage of a multi-stage evaporator, having condenser means and an integral liquid heater. More specifically, the present invention relates to an evaporator unit having an integral means for heating a supply or feed liquid by flash-evaporating and condensing a hot fluid.

In liquid evaporators, thermal economy is often achieved by repetitive evaporation of a liquid at successively lower pressures using the vapor produced in a preceding evaporation step as a source of heat in a succeeding lower pressure evaporation step. Apparatus designed for carrying out processes of this type are generally referred to as multi-stage evaporators. In the interest of further thermal economy, heat exchangers are often used to extract heat from various effluent streams within multi-stage evaporators and to transfer the heat to liquid streams which are subsequently evaporated. These heat exchangers and their associated connections add significantly to the equipment cost of multi-stage evaporators and complicate their operation and maintenance.

It is an object of this invention to provide an evaporator unit, particularly adapted for use in multi-stage evaporators, having evaporating and condensing surfaces and an integral means for heating a liquid to be evaporated.

It is another object of this invention to effect greater thermal economy in a multi-stage evaporator by providing, as at least one stage of the evaporator, an evaporator unit with integral means for extracting and utilizing heat from liquids produced in a higher pressure stage of the evaporator.

A further object of this invention is to provide a simplified evaporator unit, having integral heat exchange means, which facilitates the design, construction, operation, and maintenance of multistage evaporators with optimum heat utilization.

Briefly, the present invention is directed to an evaporator unit suitable for use in a multi-stage evaporator and including a housing enclosing an upper vapor space and a lower collector space, an inlet conduit supplying feed liquid to the unit at the collector area, and the improvement of integral heater means for said unit comprising a heater unit section of the inlet conduit having at least one portion of the conduit which extends transversely of at least one compartment in said collector space, and nozzle means directing a relatively hot fluid to the outer surface of the transversely-extending conduit portion. The relatively hot fluid gives up its heat of condensation to the feed liquid which is then directed through a nozzle in the upper vapor space of the housing onto an evaporation surface on one wall enclosing said space. Unevaporated feed liquid effluent from the evaporation surface and condensate from an opposing condensing surface on a second wall enclosing said space are collected in respective collector compartments in the collector area having suitable outlets therein.

In some cases, more than one hot fluid may be available to heat the liquid in the conduit, and, in the preferred embodiment of the present invention, separate means are provided to flash-evaporate and to condense these hot fluids while keeping them separate from one another.

This invention is particularly adapted for use in multi-stage evaporators where a liquid produced in one evaporator stage may be used as the hot fluid which is flash-evaporated and condensed in a subsequent or lower-pressure stage.

While the specification concludes with claims particularly pointing out and distinctly claiming the subject matter of the present invention it is believed that the invention will be better understood from the following description taken in conjunction with the accompanying drawings in which:

Figure 1:
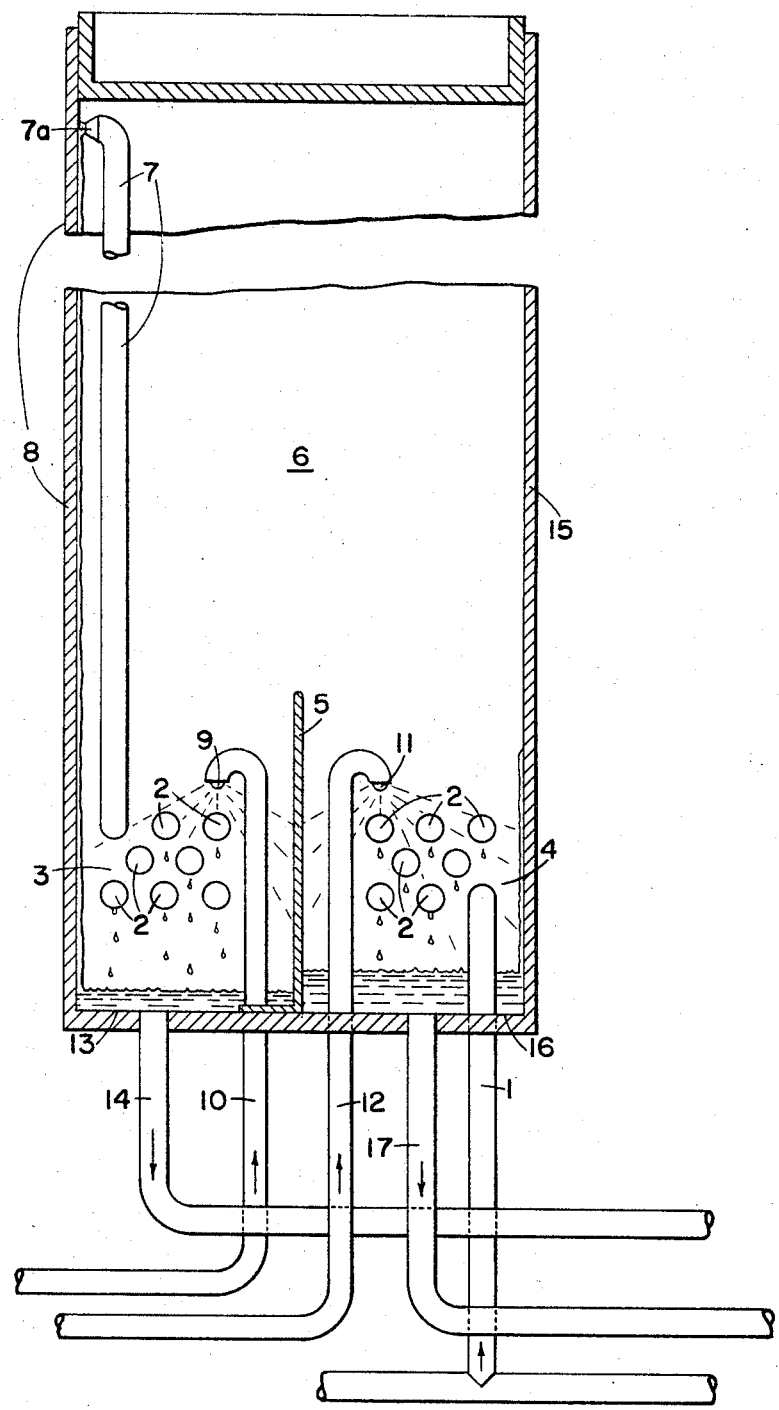
FIGURE 1 is a sectionalized view of the preferred embodiment of the present invention.

Referring more specifically to FIGURE 1, there is shown the internal arrangement of an evaporator unit which may comprise one stage of a multi-stage evaporator. In this, the preferred embodiment of the present invention, liquid inlet pipe 1 is connected to a conduit 2, which traverses vertical compartments 3, 4 formed by separator 5 in the region below the main vapor space 6 of the evaporator unit. Conduit 2 may be a single serpentine conduit or a plurality of parallel tubes. The conduit 2 is also connected to pipe 7 having a termination 7a which distributes liquid from the pipe 7 on the evaporation surface 8 of the evaporator unit. Within the vertical compartment 3, nozzle 9 directs a hot fluid entering the evaporator unit through inlet pipe 10 toward the outer surface of that portion of conduit 2, within the vertical compartment 3. A similar arrangement in vertical compartment 4 is provided so that nozzle 11 directs a hot fluid entering the evaporator through inlet pipe 12 toward the outer surface of that portion of the conduit 2 within the vertical compartment 4. If only one hot fluid is available to be flash-evaporated and condensed, one of the nozzles 9 or 11, along with its corresponding inlet pipe 10 or 12, may be eliminated. Preferably, the hot fluids used are liquids near their vapor point, that is they have a sufficiently high pressure so that at least a portion thereof will instantaneously evaporate as it leaves the nozzles 9, 11. The vaporized portion subsequently condenses on the outer surface of conduit 2 giving up its heat of condensation to the liquid within the conduit. A trough 13 in which unevaporated liquid from evaporation surface 8 is collected along with condensate formed in vertical compartment 3 and unevaporated liquid from nozzle 9 empties into outlet pipe 14. A similar trough 16, having an outlet pipe 17, collects condensate formed on the condensation surface 15 along with condensate formed in vertical compartment 4 and unevapoarted liquid from nozzle 11.

In a typical mode of operation, the evaporator unit illustrated in FIGURE 1 comprises one stage of a multi-stage apparatus. In this stage a feed liquid is first heated and then evaporated. Heating the feed liquid prior to evaporation increases the proportion of the liquid which evaporates and this is accomplished, in accordance with the present invention, by the integral liquid heater located within the evaporator unit. Thus, the efficiency of the evaporator unit is improved with a minimum of additional equipment.

More specifically, the feed liquid enters the evaporator unit through inlet pipe 1 and is heated as it passes through conduit 2 by the absorption of heat of condensation from the hot fluids entering the evaporator unit through inlet pipes 10 and 12 which flash-evaporate as they leave nozzles 9 and 11 and then condense on the outer surface of conduit 2. Condensate and unevaporated liquid from a preceeding or higher pressure stage evaporator unit of the multi-stage apparatus may be used as the hot fluids since, in addition to being readily available, they are already hot and are presumably near their vapor point as they leave the preceding or higher pressure evaporator stage. Similarly, since the unevaporated liquid collected in trough 13 and the condensate collected in trough 16 are hot liquids near their vapor point, they may also be used as hot fluids in a succeeding or lower pressure evaporator stage. In this way any number of similar evaporator units may be connected into a simplified multi-stage evaporator characterized by excellent heat efficiency and maximum evaporation in each stage.

Figure 2:
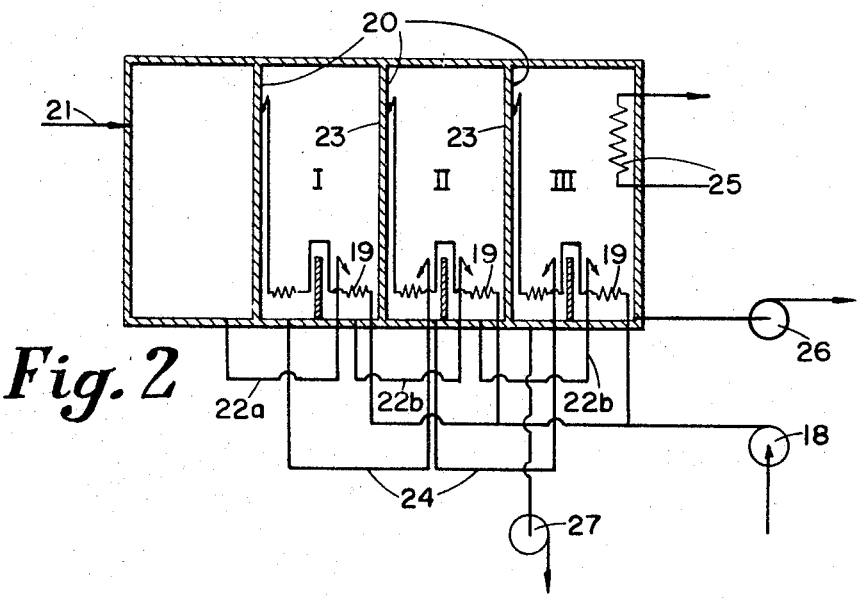
FIGURE 2 is a schematic representation of a multi-stage evaporator in which one embodiment of the present invention is used.

FIGURE 2 is a schematic representation of a simple multi-stage evaporator, in which one embodiment of the present invention may be used. In this evaporator, three evaporator stages I, II, and III, operating at successively lower pressures, are used. Feed liquid is fed via pump 18 in parallel to the integral heaters 19 located in each of the three evaporator stages. Integral heaters 19 include separate means to flash evaporate and condense two hot fluids as illustrated in more detail in FIGURE 1. From integral heaters 19, the feed liquid is passed to evaporation surfaces 20 of each of the three evaporator stages. Heat is applied to the initial or high pressure stage I from a steam source 21. Condensate 22a formed in heating the evaporation surface of the initial stage and also condensate 22b formed on condensation surfaces 23 of evaporator stages I and II are passed to the subsequent evaporator stages I, II, and III, respectively, where they are flash-evaporated and condensed in a section of the integral heaters 19 corresponding to space 4 in FIGURE 1 to heat the feed liquid passing through the integral heaters 19. Similarly, unevaporated liquid 24 collected in evaporator stages I and II is passed to stages II and III, respectively, where it is flash-evaporated and condensed in a section of integral heaters 19 corresponding to space 3 in FIGURE 1 to heat the feed liquid passing through integral heaters 19. Cooling water from a source 25 cools the vapors in final stage III of the apparatus and causes condensation therein. Pumps 26 and 27 remove condensate and unevaporated liquid, respectively, from final stage III of the apparatus.

Figure 3:
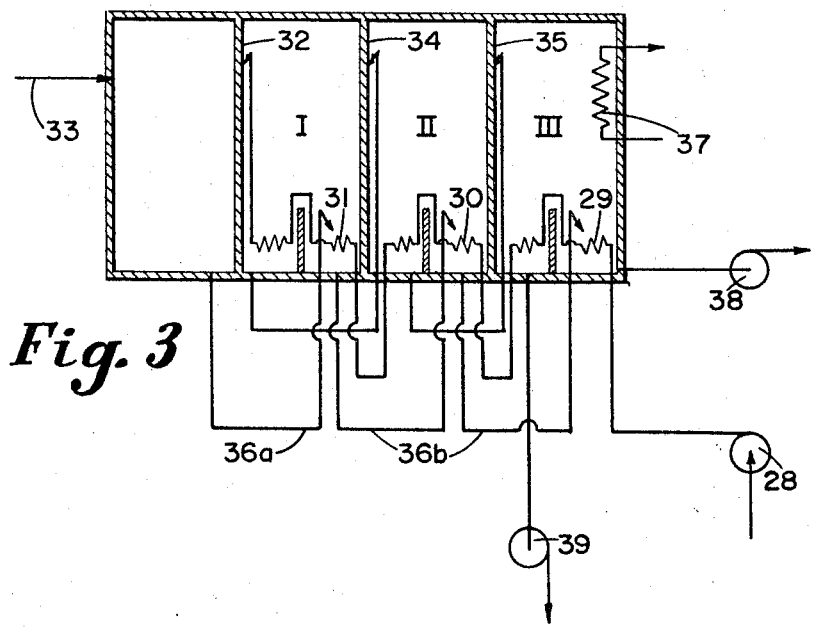
FIGURE 3 is a schematic representation of another multi-stage evaporator similar to FIGURE 2 in which the present invention is used.

FIGURE 3 is a schematic representation of a multi-stage evaporator similar to that illustrated in FIGURE 2 but differing in that feed liquid is fed in sequence through the apparatus illustrated in FIGURE 3 rather than in parallel as illustrated in FIGURE 2. In the evaporator illustrated in FIGURE 3, feed liquid is passed by pump 28 successively through integral heaters 29, 30, and 31 located in evaporator stage III, the lowest pressure evaporator stage, stage II, the intermediate evaporating stage, and stage I, the initial or high pressure evaporator stage. In each of these evaporator stages, the feed liquid is heated as it passes through the integral heaters by the flash-evaporation and condensation of a single hot fluid stream, more specifically, condensate formed either in a higher pressure evaporator stage or in heating the evaporation surface of the high pressure evaporator stage. Since a single hot fluid is used as the heating means in this evaporator, an embodiment of the present invention may be used in which liquid inlet 10 and nozzle 9 of FIGURE 1 are eliminated.

As illustrated, steam, from a source 33, is used to heat the evaporation surface 32 in the initial or high pressure evaporator stage I. Unevaporated liquid from evaporation surface 32 is passed to evaporation surface 34 of evaporator stage II and unevaporated liquid collected in evaporator stage II is passed to evaporation surface 35 in evaporator stage III. Condensate 36a produced in heating the evaporation surface 32 of evaporator stage I and condensate 36b produced in evaporator stages I and II are passed to integral heaters 31, 30, and 29 of evaporator stages I, II, and III to be flash-evaporated and condensed therein, heating the feed liquid as it passes through the integral heaters in these stages. As in the multi-stage evaporator schematically illustrated in FIGURE 2, the embodiment illustrated in FIGURE 3 also includes a source of cooling water 37 which is used to cool the vapors in the final evaporator stage causing condensation therein. Pumps 38 and 39 remove condensate and unevaporated liquid, respectively, from the final stage III of the apparatus.

The present invention should not be construed to be limited to these specifically disclosed embodiments, however, since numerous modifications may be made by those skilled in the art without departing from the true spirit and scope of this invention. The appended claims are, therefore, intended to cover all such equivalent variations which come within the true spirit and scope of this invention.

What I claim as new and desire to secure by Letters Patent of the United States is:

1. An evaporator unit comprising:
 a housing enclosing an upper vapor space having opposing evaporating wall and condensing wall surfaces and a plurality of lower collector compartments each having an outlet therein;
 an inlet conduit supplying feed liquid to said unit, said conduit entering said unit in the area of said compartments;
 integral heater means in said unit including,
  a heater section of said inlet conduit comprised of at least one portion of said conduit extending substantially transversally of at least one of said collector compartments, and
  nozzle means positioned to direct a relatively hot fluid on to the outer surface of said one portion of said inlet conduit, whereby said hot fluid gives up its heat of condensation to said feed liquid; and
 delivery conduit means in series flow relation with said one portion of said inlet conduit and receiving feed liquid therefrom, said delivery conduit means having an outlet at the upper end of said vapor space closely adjacent said evaporating wall surface for directing heated feed liquid thereon, wherein respective ones of said collector compartments capture unevaporated feed liquid and condensate effluent, respectively, from said evaporating and said condensing wall surfaces.

2. The invention according to claim 1 wherein at least one of said collector compartments is arranged to receive unevaporated feed liquid introduced on to said evaporating wall surface by said delivery conduit and wherein another of said collector compartments separate from said one of said collector compartments receives condensate from said condensing wall surface of said housing and from said outer surfaces of said one portion of said inlet conduit.

3. An evaporator unit for use in a multi-stage flash evaporator comprising:

a housing enclosing an upper vapor space bounded on one side by an evaporating wall surface and on an opposing side by a condensing wall surface, and at least two separate collector compartments in the lower portion of said housing open to said vapor space, said compartments each having an outlet in a bottom wall thereof;

inlet conduit means supplying feed liquid to said evaporator unit, said inlet conduit means entering said unit through one of said separate compartments and having a delivery portion including an outlet directing feed liquid on to said evaporating wall surface at the upper edge thereof;

integral heater means in said unit comprising,
- a first heater section of said inlet conduit means located in said one of said compartments and comprised of at least one portion of said inlet conduit means extending substantially transversally of said one collector compartment,
- a second heater section of said inlet conduit means located in the other of said collector compartments, said second heater section being intermediate said first section and said delivery portion and comprised of at least another portion of said inlet conduit means extending substantially transversely of said other of said collector compartments, and
- at least first and second nozzle means positioned to direct relatively hot fluids near their vapor points on to the outer surfaces of said first and second heater sections, respectively, whereby the respective fluids give up their heats of condensation to said feed liquid; and separate discharge conduits connected to the respective ones of said collector compartment outlets, whereby unevaporated fluid effluent from said evaporating wall and condensate from said second heater section captured in said other of said collector compartments and condensate from said condensing wall surface and from said first heater ection captured in said one of said collector compartments is drawn from said unit.

References Cited
UNITED STATES PATENTS

| | | | |
|---|---|---|---|
| 3,275,530 | 9/1966 | Akers | 202—236 |
| 3,395,084 | 7/1968 | Loebel et al. | 202—236 |
| 1,790,986 | 2/1931 | Harris | 122—41 |
| 2,141,941 | 12/1938 | Stewart | 165—117 |
| 2,348,601 | 5/1944 | Buschow et al. | 165—115 |
| 3,146,177 | 8/1964 | Chalmers et al. | 202—173 X |
| 3,146,609 | 9/1964 | Engalitcheff | 165—117 X |
| 3,216,910 | 11/1965 | Langer et al. | 202—173 |
| 3,219,552 | 11/1965 | Starmer et al. | 202—173 |
| 3,291,704 | 12/1966 | Diedrich et al. | 202—236 |
| 3,192,132 | 6/1965 | Loebel | 203—11 |

NORMAN YUDKOFF, *Primary Examiner.*

DAVID EDWARDS, *Assistant Examiner.*

U.S. Cl. X.R.

202—172, 236; 203—89